United States Patent
He et al.

(10) Patent No.: US 9,767,075 B2
(45) Date of Patent: Sep. 19, 2017

(54) SYSTEM AND METHOD FOR IMPLEMENTING SCREEN CAPTURE

(71) Applicant: Alibaba Group Holding Limited, George Town (KY)

(72) Inventors: Honghui He, Beijing (CN); Yukun Chen, Beijing (CN); Xin Ji, Beijing (CN); Pengjie Zhao, Beijing (CN); Bin Liu, Beijing (CN); Chunxia Li, Beijing (CN); Yali Wang, Beijing (CN); Wenlong Xie, Beijing (CN)

(73) Assignee: Alibaba Group Holding Limited (KY)

( * ) Notice: Subject to any disclaimer, the term of this patent is extended or adjusted under 35 U.S.C. 154(b) by 130 days.

(21) Appl. No.: 14/600,832

(22) Filed: Jan. 20, 2015

(65) Prior Publication Data

US 2015/0212978 A1    Jul. 30, 2015

(30) Foreign Application Priority Data

Jan. 24, 2014 (CN) .......................... 2014 1 0036471

(51) Int. Cl.
*G06F 17/20* (2006.01)
*G06F 17/21* (2006.01)
*G06F 9/44* (2006.01)

(52) U.S. Cl.
CPC .......... *G06F 17/211* (2013.01); *G06F 9/4443* (2013.01)

(58) Field of Classification Search
CPC .................................................. G06F 9/4443
See application file for complete search history.

(56) References Cited

U.S. PATENT DOCUMENTS 8,797,338 B2   8/2014   Muir
8,827,813 B2   9/2014   Lemay et al.
(Continued)

FOREIGN PATENT DOCUMENTS

WO         2014012456        1/2014

OTHER PUBLICATIONS

Anonymous, "Screenshot Ultimate", Ice Cold Apps, Jul. 11, 2013, Accessed at https://web.archive.org/web/20131121035339/https://play.google.com/store/apps/details?id=com.icecoldapps.screenshotultimate&ht=en on Mar. 16, 2015.

*Primary Examiner* — Stephen Hong
*Assistant Examiner* — Shahid Khan
(74) *Attorney, Agent, or Firm* — Van Pelt, Yi & James LLP (57) ABSTRACT

Embodiments of the present application relate to a system for implementing screen capture, a method for implementing screen capture, and a computer program product for implementing screen capture. A method for implementing screen capture is provided. The method includes providing multiple types of screen capture adapters, selecting a screen capture adapter that is of a type corresponding to a preset mobile terminal application type as a target type screen capture adapter, the screen capture adapters being selected from among the provided multiple types of screen capture adapters, registering the target type screen capture adapter, providing screen capture implementing techniques that correspond to the multiple types of screen capture adapters, and performing screen capture by invoking a screen capture implementing technique that corresponds to the registered target type screen capture adapter, the screen capture implementing technique being selected from among the provided screen capture implementing techniques.

16 Claims, 5 Drawing Sheets

(56) References Cited

U.S. PATENT DOCUMENTS

2002/0078144 A1* 6/2002 Lamkin ............ G06F 17/30017
                                                    709/203
2006/0101053 A1* 5/2006 Proctor ............... G06F 9/44505
2009/0153561 A1   6/2009 Sun et al.
2010/0265261 A1* 10/2010 Chandler ................. G09G 5/36
                                                    345/547
2013/0143620 A1   6/2013 Seo

* cited by examiner

SYSTEM AND METHOD FOR IMPLEMENTING SCREEN CAPTURE

CROSS REFERENCE TO OTHER APPLICATIONS

This application claims priority to People's Republic of China Patent Application No. 201410036471.8 entitled A SCREEN CAPTURE SYSTEM AND A METHOD FOR IMPLEMENTING SCREEN CAPTURE, filed Jan. 24, 2014 which is incorporated herein by reference for all purposes.

FIELD OF THE INVENTION

The present application relates to a system and a method for implementing screen capture.

BACKGROUND OF THE INVENTION

As communication technology develops, cell phones and other mobile terminals have become more powerful. Not only can one make telephone calls and send short messages with a mobile terminal, one can also install various applications (apps) on the cell phones and the other mobile terminals to perform various functions. When using a mobile terminal, the mobile terminal often captures and stores an image within an application (app). The capturing and storing of the image process is also known as screen capture.

The screen capture technique of existing mobile terminals using the Android system includes executing the screen capture through SurfaceView. However, images captured through the SurfaceView screen capture will turn black within the SurfaceView zone due to the way screen capture in SurfaceView is implemented. Because SurfaceView and commonView are in different hierarchies with respect to rending, only black images are captured through the SurfaceView screen capture technique when using a mobile terminal. The screen capture result is poor, and only a single method for implementing the screen capture exists.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
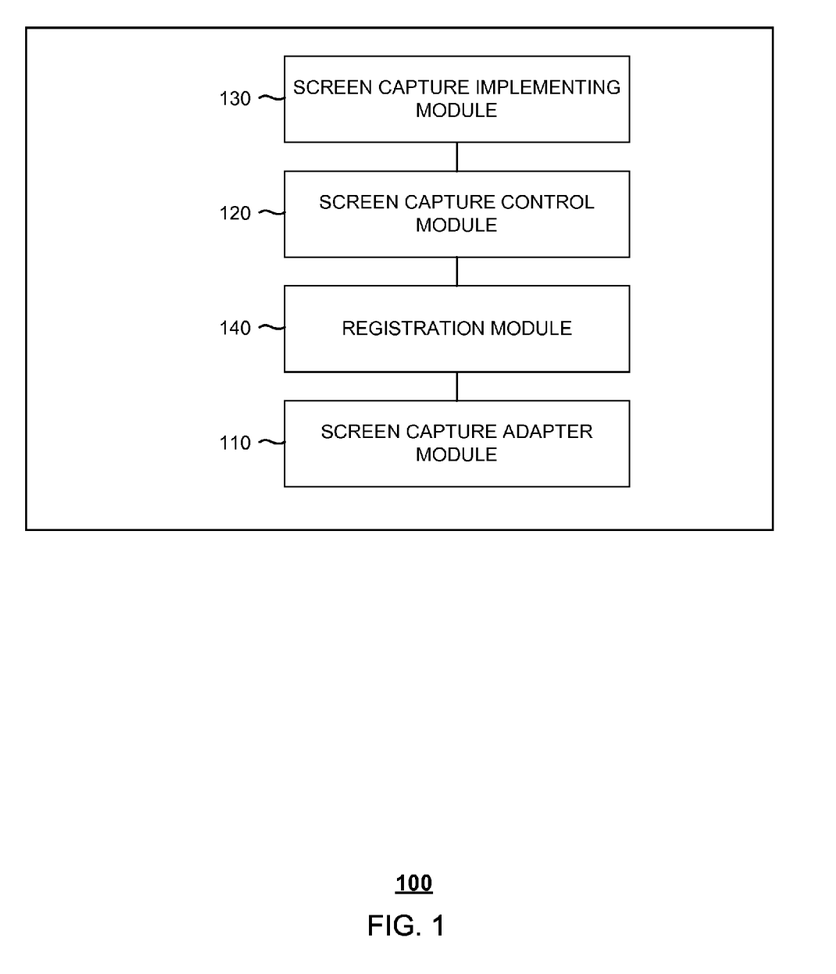
FIG. 1 is a structural diagram illustrating an embodiment of a system for implementing screen capture.

FIG. 1 is a structural diagram illustrating an embodiment of a system for implementing screen capture. In some embodiments, the system 100 implements the process 400 of FIG. 4 and includes a screen capture adapter module 110, a screen capture control module 120, a screen capture implementing module 130, and a registration module 140.

In some embodiments, the screen capture adapter module 110 provides multiple types of screen capture adapters. In some embodiments, the multiple types of screen capture adapters includes application (app) screen capture adapters, video screen capture adapters, root screen capture adapters, user defined custom screen capture adapters, or any combination thereof. The implementations of these various types of adapters are provided using libraries, application programming interfaces (APIs), or the like that are known to those skilled in the art.

In some embodiments, registration module 140 is coupled to the screen capture adapter module 110. The registration module 140 selects, based on a preset mobile terminal application type and the screen capture adapter module 110, a screen capture adapter that is of a type corresponding to the preset mobile terminal application type. The selected screen capture adapter is regarded as the target type screen capture adapter, and the registration module 140 registers the target type screen capture adapter. Because different screen capture techniques are to be adopted for different views, different types of screen capture adapters are used to screen capture the different views. Thus, different screen capture adapters having different functions and implementations are used to perform screen captures for different application types. For example, to capture a video screen, a first type of screen capture adapter is used, and to capture an application screen, second type of screen capture adapter is used. In some embodiments, the target type screen capture adapter is registered by invoking a "registerScreenShot" function (screen capture adapter registration function). Please note that the "registerScreenShot" function is a library function and is used to pass an app's root view to the screen capture adapter because the screen capture is performed from the app's root view.

In some embodiments, the screen capture control module 120, which is coupled to the screen capture implementing module 130 and the registration module 140, performs screen capture by invoking a screen capture implementing technique that corresponds to the registered target type screen capture adapter (e.g., an application screen capture, a video screen capture, etc.) and are provided by the screen capture implementing module 130.

An application screen capture adapter can be used with a mobile terminal having an application type corresponding to ordinary authority that a user of the mobile terminal has. Each screen capture adapter corresponds to a certain application type. In an example, a video screen capture adapter is used with a mobile terminal having an application type corresponding to video playing on the screen of the mobile terminal. In another example, a root screen capture adapter is used with a mobile terminal having an application type corresponding to root authority (e.g., a jailbroken mobile terminal). In yet another example, a user defined custom screen capture adapter allows a user to set an adapter based on an application type being used on the mobile terminal. For example, in the event that the mobile terminal applications include SurfaceView, the user can perform a screen capture using a user defined custom screen capture adapter.

In some embodiments, regarding registration of the target type screen capture adapters, the target type screen capture adapters are registered by a "registerScreenShot" function, which is a screen capture adapter registration function.

Performing a screen capture by invoking screen capture implementing techniques that correspond to the registered target type screen capture adapters and are provided by the screen capture implementing module includes: performing a screen capture by invoking a "takeScreenShot" (screen capture function) function that corresponds to the registered target type screen capture adapter and is provided by the screen capture implementing module. A screen shot can be acquired and sent back based on the registered target type screen capture adapter by invoking the "takeScreenShot" screen capture function.

In some embodiments, the screen capture implementing module 130 provides screen capture implementing techniques individually corresponding to multiple types of screen capture adapters. In some embodiments, a screen capture implementing technique implemented by an application screen capture adapter corresponds to an application screen capture implementing technique; a screen capture implementing technique implemented by a video screen capture adapter corresponds to a video screen capture implementing technique; a screen capture implementing technique implemented by a root screen capture adapter corresponds to a root screen capture implementing technique; and a screen capture implementing technique implemented by a user defined custom screen capture adapter corresponds to a user defined custom screen capture implementing technique. Because different application types have different views, for example, the views are categorized into two categories: commonView and SurfaceView. As an example, when no SurfaceView exists in a window (e.g., a mobile terminal screen), a common app screen capture adapter can be used to capture a screen image. In another example, when a SurfaceView exists in a window, a screen capture adapter capable of capturing a SurfaceView image should be adopted because the common app screen capture adapter is not capable of performing a screen capture of the SurfaceView image. Different views uses different techniques to capture screen images, and each technique corresponds to a certain kind of adapter. With respect to a rooted device, the rooted device is capable of reading files where the system stores a current screen image. So, for rooted devices, a screen image can be captured directly by reading the file where the screen image is stored.

For example, each type of adapter corresponds to a screen capture implementation (e.g., implemented using different code), and various types of adapters are independent of each other. Thus, greater flexibility exists.

The example below of a mobile terminal with a preset application type of video is used for illustrative purposes.

Based on the mobile terminal preset application type being video, the user selects a video screen capture adapter in the screen capture adapter module 110, and the video screen capture adapter is registered with the screen capture control module 120 using the "registerScreenShot" technique. In some embodiments, the user manually selects the video screen capture adapter. In some embodiments, the user refers to a software engineer who selects the corresponding screen capture adapter programmatically. The screen capture control module 120 performs screen capture by invoking a video screen capture implementation technique that corresponds to the video screen capture adapter and is provided by the screen capture implementing module 130.

The system 100 provides multiple types of screen capture adapters through a screen capture adapter module 110. The screen capture implementing module 130 provides screen capture implementing techniques individually corresponding to multiple types of screen capture adapters. After the registration module 140 selects a target type screen capture adapter and registers the selected target type screen capture adapters, the screen capture control module 120 performs screen capture by invoking a screen capture implementing technique that corresponds to the registered target type screen capture adapter and that is provided by the screen capture implementing module 130. As a result, the system 100 can select different adapters to affect screen capture. The different adapters have different implementation techniques that can adapt to various situations. This system 100 can increase the efficiency for the variety of techniques for implementing screen capture.

Figure 2:
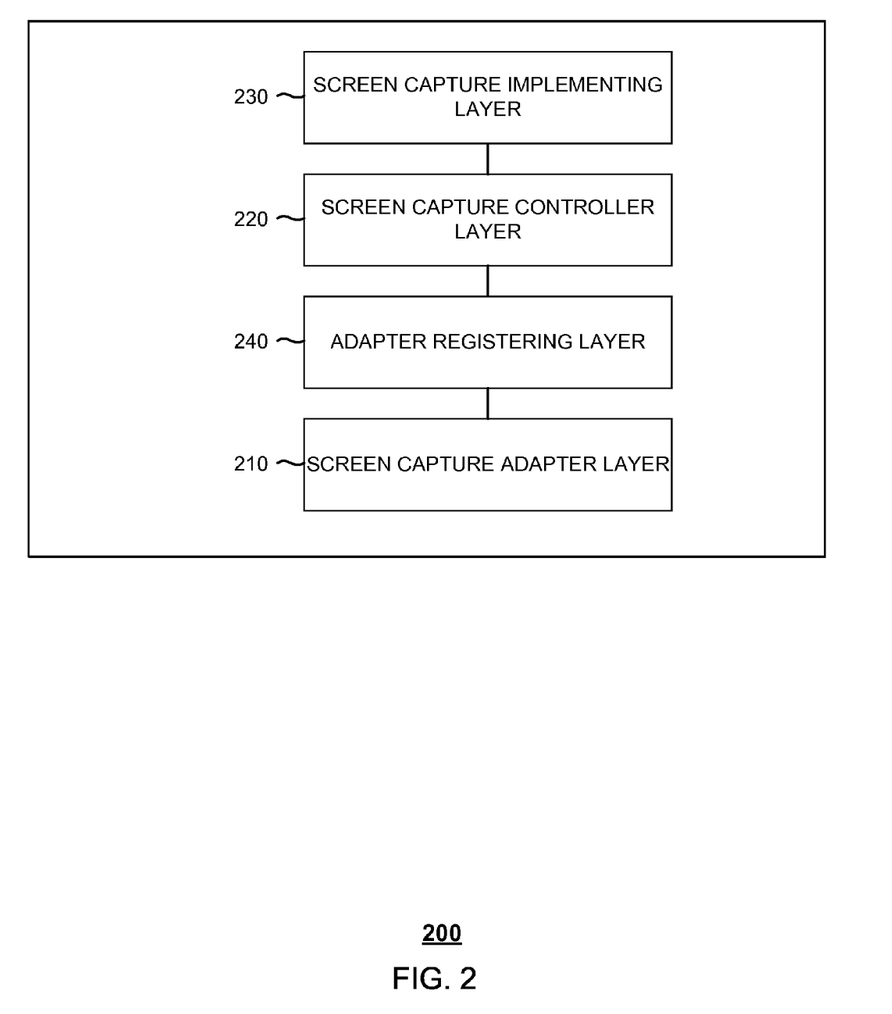
FIG. 2 is a structural diagram illustrating an embodiment of a screen capture library.

System 100 can be implemented using a screen capture class or a screen capture library. In some embodiments, the screen capture class or screen capture library is implemented through a Java language or a Java-style language. For illustrative purposes, an example of a screen capture library based on the above embodiment is provided. FIG. 2 is a structural diagram illustrating an embodiment of a screen capture library. In some embodiments, the screen capture library 200 includes a screen capture adapter layer 210, a screen capture controller layer 220, a screen capture implementing layer 230, and an adapter registering layer 240.

In some embodiments, the screen capture adapter layer 210 provides multiple types of screen capture adapters. In some embodiments, the multiple types of screen capture adapters include application (app) screen capture adapters, video screen capture adapters, root screen capture adapters, user defined custom screen capture adapters, or any combination thereof.

In some embodiments, the adapter registering layer 240, based on preset mobile terminal application types, selects a target type screen capture adapter and registers the selected target type screen capture adapter.

In some embodiments, the screen capture controller layer 220 performs screen capture by invoking the screen capture implementing technique that corresponds to the registered target type screen capture adapter and is provided by the screen capture implementing layer 230.

In some embodiments, the screen capture implementing layer 230 provides screen capture implementing techniques individually corresponding to multiple types of screen capture adapters. In some embodiments, each screen capture implementing technique is implemented as one or more function call, routines, or other programming code. In some embodiments, a screen capture implementing technique corresponding to an application screen capture adapter corresponds to an application screen capture implementing technique; the screen capture implementing technique corresponding to a video screen capture adapter corresponds to a video screen capture implementing technique; the screen capture implementing technique corresponding to a root screen capture adapter corresponds a root screen capture implementing technique; and the screen capture implementing technique corresponding to a user self-defined screen capture adapter corresponds to a self-defined screen capture implementing technique.

For example, each type of adapter corresponds to a screen capture implementation (Impl), and the various types of adapters are independent of each other. Thus, a greater flexibility exists.

For illustrative purposes, an example of a mobile terminal with a preset application type of video is provided.

Based on the mobile terminal preset application type being video, the user selects a video screen capture adapter in the screen capture adapter layer 210, and the video screen capture adapter is registered with the screen capture controller layer 220 based on the "registerScreenShot" (screen capture adapter registration function) technique. The screen capture controller layer 220 performs a screen capture by invoking the video screen capture implementing technique that corresponds to the video screen capture adapter and is provided by the screen capture implementing layer 230.

Figure 3:
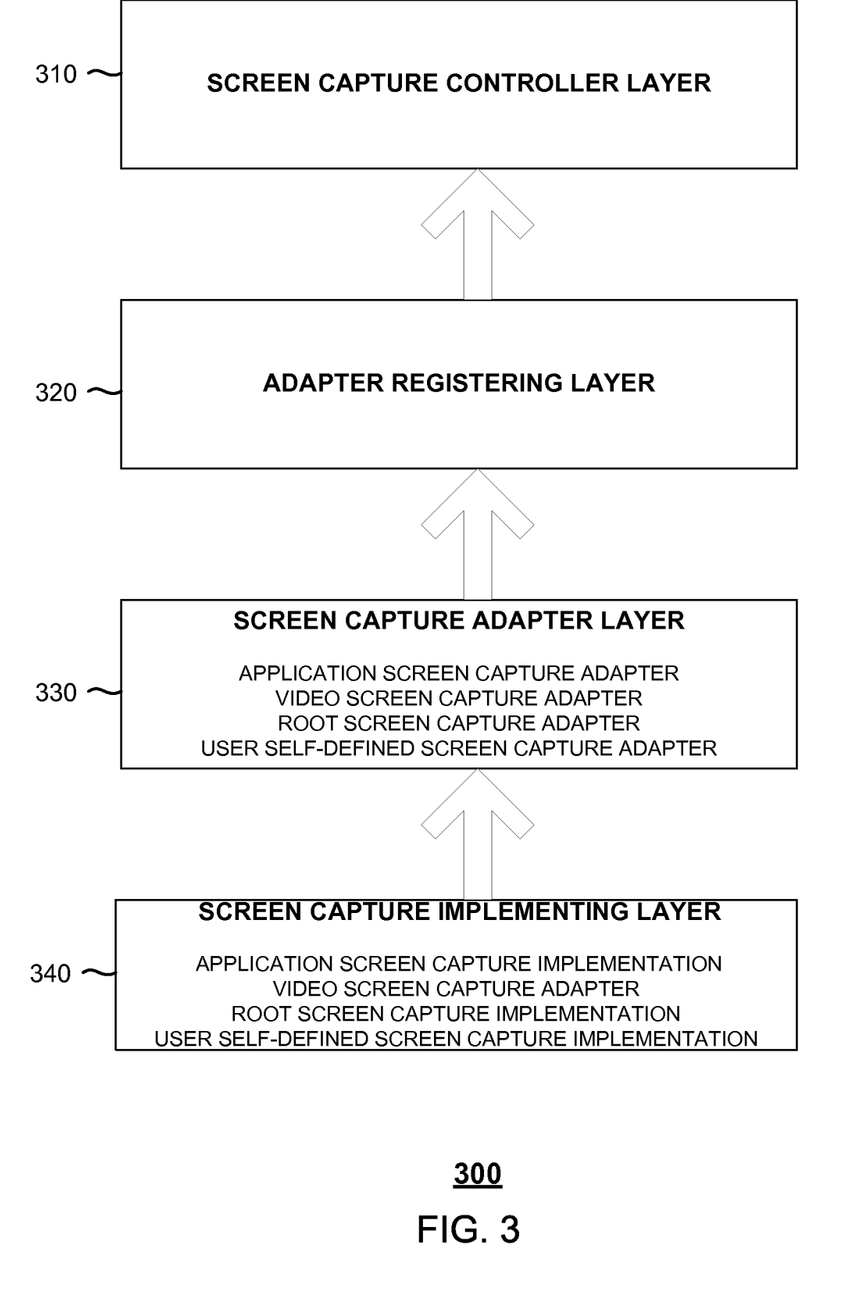
FIG. 3 is a structural diagram illustrating another embodiment of a screen capture library.

FIG. 3 is a structural diagram illustrating another embodiment of a screen capture library. In some embodiments, the structure of this screen capture library 300 is called a screen capture library structure (ScrShotLib Structure). The screen capture library structure includes a screen capture controller layer 310, a screen capture adapter layer 330, and a screen capture implementing (Implements) layer 340. In some embodiments, the screen capture adapter layer 330 includes an application screen capture adapter (AppScrShotAdapter), a video screen capture adapter (VideoScrShotAdapter), a root screen capture adapter (RootedScrShotAdapter), and a user defined custom screen capture adapter (CustomAdapter). In some embodiments, each layer refers to a layer in software development where software services are divided into different layers, and each layer has its own function and provides an application interface, which ensures a relatively singular function for each layer so that the modification of one layer does not influence other layers. The screen capture implementing (Implements) layer 340 includes an application screen capture implementation (AppScrShotImpl), a video screen capture implementation (VideoScrShotImpl), a root screen capture implementation (RootedScrShotImpl), and a user defined custom screen capture implementation (CustomImpl). The use and role of each layer within the screen capture library structure is similar to the use and the role of the corresponding layer in the above screen capture library 200 of FIG. 2 and will not be discussed here for conciseness.

The screen capture library 300 provides multiple types of screen capture adapters through a screen capture adapter layer 330. The screen capture implementing layer 340 provides screen capture implementing techniques individually corresponding to multiple types of screen capture adapters. After the adapter registering layer 320, based on preset mobile terminal application types, regards screen capture adapters that are of types corresponding to preset mobile terminal application types and that were selected by the screen capture adapter layer 330 as target type screen capture adapters and registers the target type screen capture adapters, the screen capture controller layer 310 performs screen capture by invoking the screen capture implementing technique that corresponds to the registered screen capture adapter and that is provided by the screen capture implementing layer 340. As a result, the system 100 of FIG. 1 can select different adapters to perform screen capture. Different adapters having different implementing techniques can adapt to various situations. These different adapters can enhance the variety of techniques for implementing screen capture.

Figure 4:
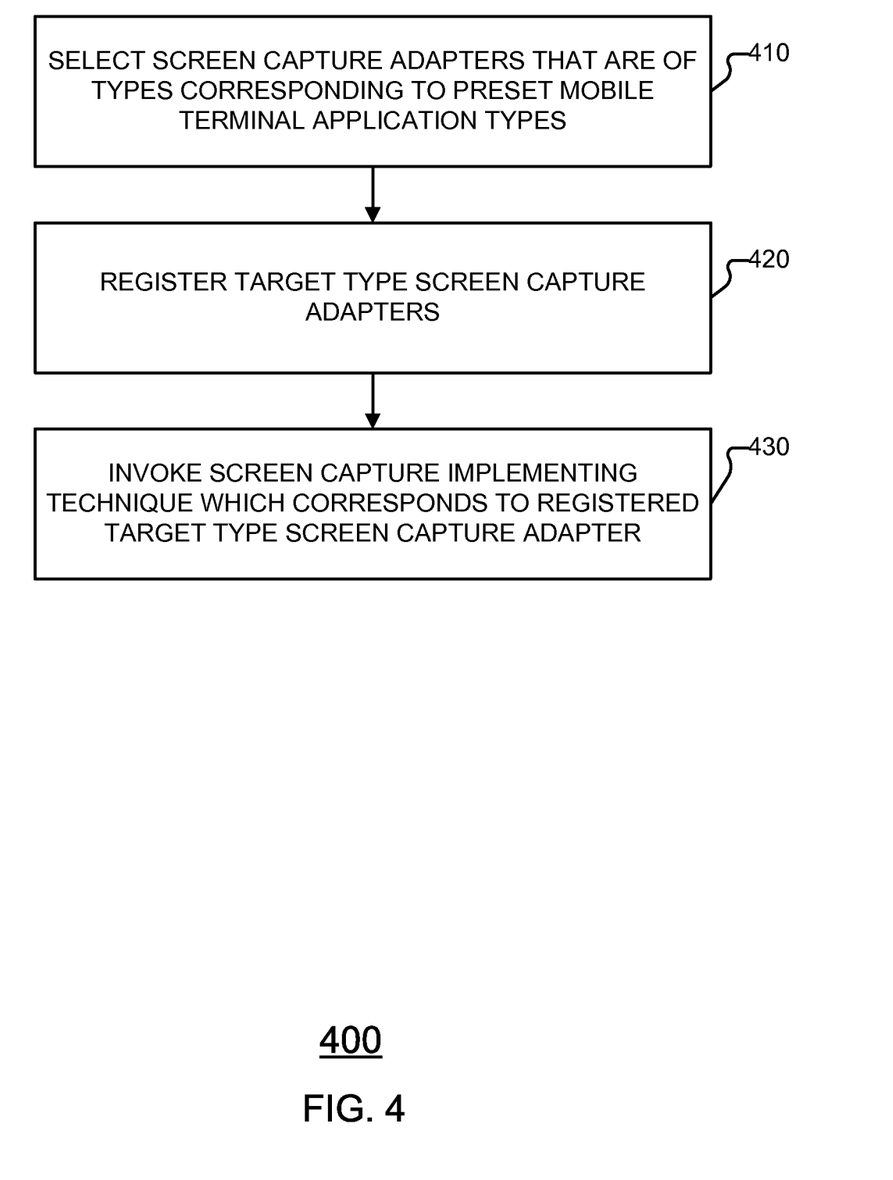
FIG. 4 is a flowchart illustrating an embodiment of a process for implementing screen capture.

FIG. 4 is a flowchart illustrating an embodiment of a process for implementing screen capture. In some embodiments, the process 400 is implemented by the system 100 of FIG. 1 and comprises:

In 410, the system, based on preset mobile terminal application types, selects screen capture adapters that are of types corresponding to preset mobile terminal application types as target type screen capture adapters and from among provided multiple types of screen capture adapters In some embodiments, the multiple types of screen capture adapters comprise application screen capture adapters, video screen capture adapters, root screen capture adapters, user defined custom screen capture adapters, or any combination thereof.

In 420, the system registers the target type screen capture adapters.

For example, the system registers the target type screen capture adapters by the "registerScreenShot" (screen capture adapter registering function) technique is possible.

In 430, the system invokes a screen capture implementing technique which, among provided screen capture implementing techniques individually corresponding to multiple types of screen capture adapters, corresponds to the registered target type screen capture adapter to perform screen capture.

In some embodiments, the system is capable of performing a screen capture by invoking the "takeScreenShot" (screen capture function) technique corresponding to the registered target type screen capture adapter.

The screen capture implementing techniques individually corresponding to multiple types of screen capture adapters includes the screen capture implementing technique corresponding to an application screen capture adapter being an application screen capture implementing technique, the screen capture implementing technique corresponding to a video screen capture adapter being a video screen capture implementing technique, a screen capture implementing technique corresponding to a root screen capture adapter being a root screen capture implementing technique, and a screen capture implementing technique corresponding to a user defined custom screen capture adapter being a self-defined screen capture implementing technique.

The above process 400 for implementing screen capture entails completing screen capture based on multiple types of screen capture adapters that are provided and of screen capture implementing techniques individually corresponding to multiple types of screen capture adapters. As a result, the system is capable of selecting different adapters to implement the screen capture. Different adapters have different implementing techniques that can adapt to various situations. This process 400 can increase the efficiency of the variety of screen capture implementing techniques.

Figure 5:
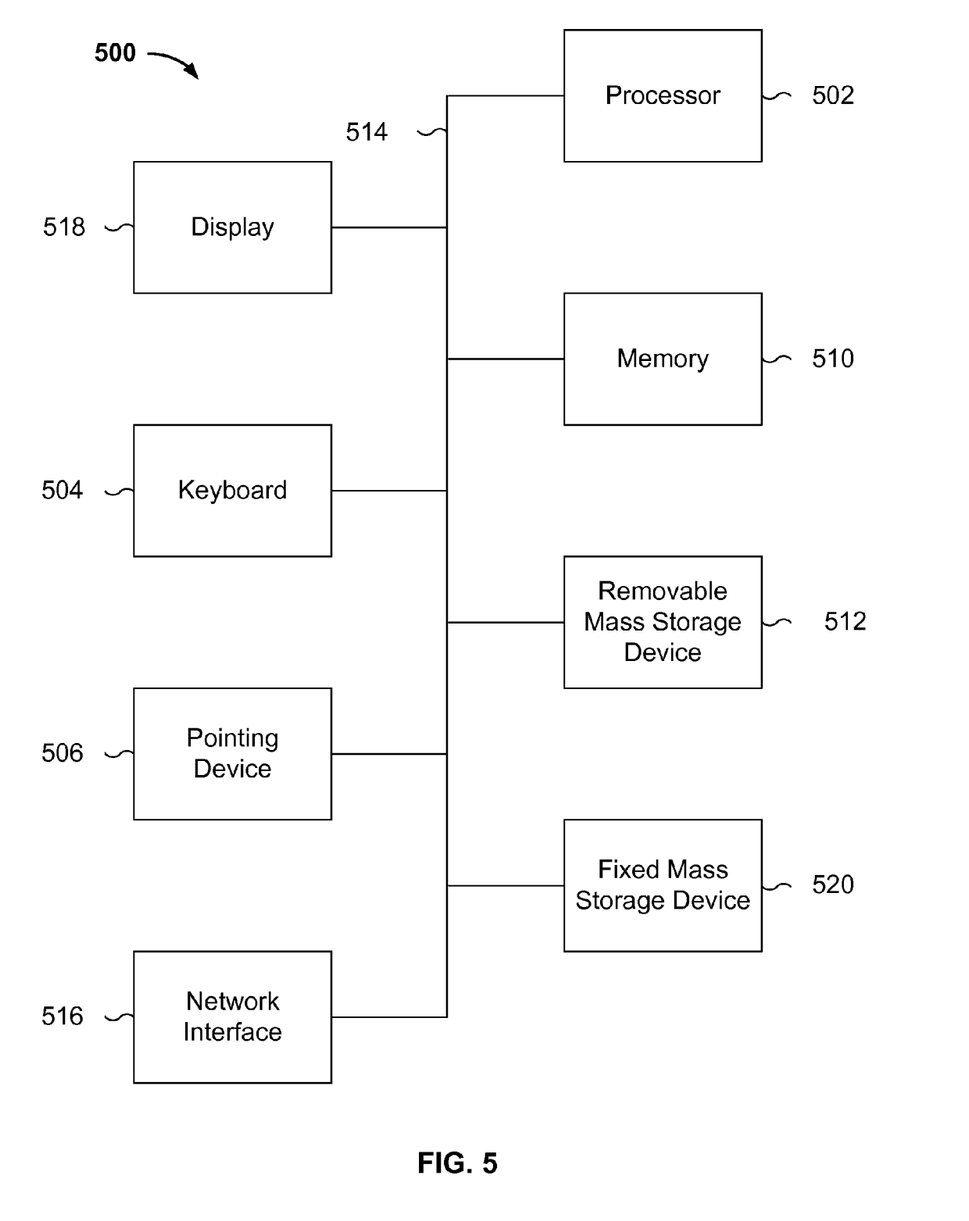
FIG. 5 is a functional diagram illustrating an embodiment of a programmed computer system for implementing screen capture.

FIG. 5 is a functional diagram illustrating an embodiment of a programmed computer system for implementing screen capture. As will be apparent, other computer system architectures and configurations can be used to implement screen capture. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown).

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage 512, 520 generally store additional programming instructions, data, and the like that typically are not in active use by the processor 502. It will be appreciated that the information retained within mass storage 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for implementing screen capture, comprising:
   a processor; and a memory coupled with the processor, wherein the memory is configured to provide the processor with instructions which when executed cause the processor to:
provide multiple types of screen capture adapters for a mobile terminal;
select a screen capture adapter that is of a type corresponding to a preset mobile terminal application type as a target type screen capture adapter, the screen capture adapter being selected from among the provided multiple types of screen capture adapters, wherein the selecting of the screen capture adapter comprises to:
determine whether a view corresponding to a hierarchy of a plurality of hierarchies exists in a window of the mobile terminal;
in the event that the view exists in the window of the mobile terminal, select a first screen capture adapter capable of capturing an image corresponding to the view;
determine whether the mobile terminal is a rooted device; and
in the event that the mobile terminal is a rooted device, select a root screen capture adapter, the root screen capture adapter being configured to directly capture a current screen image by reading a file storing the current screen image;
register the target type screen capture adapter;
provide screen capture implementing techniques that correspond to the multiple types of screen capture adapters; and
perform screen capture by invoking a screen capture implementing technique that corresponds to the registered target type screen capture adapter, the screen capture implementing technique being selected from among the provided screen capture implementing techniques.

2. The system as described in claim 1, wherein the registering of the target type screen capture adapters comprises:
register the target type screen capture adapter by invoking a screen capture adapter registering function.

3. The system as described in claim 1, wherein the performing of the screen capture by invoking the screen capture implementing technique that corresponds to the registered target type screen capture adapter comprises:
perform the screen capture by invoking a screen capture function that corresponds to the registered target type screen capture adapter.

4. The system as described in claim 1, wherein the multiple types of screen capture adapters further include application screen capture adapters, video screen capture adapters, user defined custom screen capture adapters, or any combination thereof.

5. The system as described in claim 4, wherein:
an application screen capture implementing technique corresponds to an application screen capture adapter;
a video screen capture implementing technique corresponds to a video screen capture adapter;
a user defined custom screen capture implementing technique corresponds to a user defined custom screen capture adapter; or
any combination thereof.

6. A method for implementing screen capture, comprising:
providing multiple types of screen capture adapters for a mobile terminal;
selecting screen capture adapter that is of a type corresponding to a preset mobile terminal application type as a target type screen capture adapter, the screen capture adapter being selected from among the provided multiple types of screen capture adapters, wherein the selecting of the screen capture adapter comprises:
determining whether a view corresponding to a hierarchy of a plurality of hierarchies exists in a window of the mobile terminal;
in the event that the view exists in the window of the mobile terminal, selecting a first screen capture adapter capable of capturing an image corresponding to the view;
determining whether the mobile terminal is a rooted device; and
in the event that the mobile terminal is a rooted device, selecting a root screen capture adapter, the root screen capture adapter being configured to directly capture a current screen image by reading a file storing the current screen image;
registering the target type screen capture adapter;
providing screen capture implementing techniques that correspond to the multiple types of screen capture adapters; and
performing screen capture by invoking a screen capture implementing technique that corresponds to the registered target type screen capture adapter, the screen capture implementing technique being selected from among the provided screen capture implementing techniques.

7. The method as described in claim 6, wherein the registering of the target type screen capture adapters comprises registering the target type screen capture adapters by invoking a screen capture adapter registering function.

8. The method as described in claim 6, wherein the performing of the screen capture by invoking the screen capture implementing technique that corresponds to the registered target type screen capture adapter comprises:
performing the screen capture by invoking a screen capture function corresponding to the registered target type screen capture adapter.

9. The method as described in claim 6, wherein the multiple types of screen capture adapters include application screen capture adapters, video screen capture adapters, user defined custom screen capture adapters, or any combination thereof.

10. The method as described in claim 9, wherein:
an application screen capture implementing technique corresponds to an application screen capture adapter;
a video screen capture implementing technique corresponds to a video screen capture adapter;
a user defined custom screen capture implementing technique corresponds to a user defined custom screen capture adapter; or
any combination thereof.

11. A computer program product for implementing screen capture, the computer program product being embodied in a tangible non-transitory computer readable storage medium and comprising computer instructions for:
providing multiple types of screen capture adapters for a mobile terminal;
selecting a screen capture adapter that is of a type corresponding to a preset mobile terminal application type as a target type screen capture adapter, the screen capture adapter being selected from among the provided multiple types of screen capture adapters, wherein the selecting of the screen capture adapter comprises:

determining whether a view corresponding to a hierarchy of a plurality of hierarchies exists in a window of the mobile terminal;

in the event that the view exists in the window of the mobile terminal, selecting a first screen capture adapter capable of capturing an image corresponding to the view;

determining whether the mobile terminal is a rooted device; and in the event that the mobile terminal is a rooted device, selecting a root screen capture adapter, the root screen capture adapter being configured to directly capture a current screen image by reading a file storing the current screen image;

registering the target type screen capture adapter;

providing screen capture implementing techniques that correspond to the multiple types of screen capture adapters; and performing screen capture by invoking a screen capture implementing technique that corresponds to the registered target type screen capture adapter, the screen capture implementing technique being selected from among the provided screen capture implementing techniques.

12. The computer program product as described in claim 11, wherein the registering of the target type screen capture adapters comprises registering the target type screen capture adapters invoking by a screen capture adapter registering function.

13. The computer program product as described in claim 11, wherein the performing of the screen capture by invoking the screen capture implementing technique that corresponds to the registered target type screen capture adapter comprises:

performing the screen capture by invoking a screen capture function corresponding to the registered target type screen capture adapter.

14. The computer program product as described in claim 11, wherein the multiple types of screen capture adapters include application screen capture adapters, video screen capture adapters, user defined custom screen capture adapters, or any combination thereof.

15. The computer program product as described in claim 14, wherein:

an application screen capture implementing technique corresponds to an application screen capture adapter is an application screen capture implementing technique;

a video screen capture implementing technique corresponds to a video screen capture adapter;

a user defined custom screen capture implementing technique corresponds to a user defined custom screen capture adapter; or any combination thereof.

16. The system as described in claim 1, wherein the selecting of the screen capture adapter further comprises to:

in the event that the view does not exist in the window of the mobile terminal, select a second screen capture adapter to capture a screen image, the second screen capture adapter being not capable of capturing the first image.

* * * * *